(12) United States Patent
Nakatani

(10) Patent No.: US 7,835,248 B2
(45) Date of Patent: Nov. 16, 2010

(54) OPTICAL DISK APPARATUS

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 484 days.

(21) Appl. No.: 11/858,656

(22) Filed: Sep. 20, 2007

(65) Prior Publication Data

US 2008/0068949 A1     Mar. 20, 2008

(30) Foreign Application Priority Data

Sep. 20, 2006     (JP) .............................. 2006-255099

(51) Int. Cl.
*G11B 7/00* (2006.01)
(52) U.S. Cl. .................. 369/100; 369/47.53; 369/53.22
(58) Field of Classification Search ........................ None
See application file for complete search history.

(56) References Cited

U.S. PATENT DOCUMENTS 7,564,754 B2 *  7/2009  Matsumoto .............. 369/53.22

2006/0072409 A1 *  4/2006  Kato et al. ............... 369/47.53

FOREIGN PATENT DOCUMENTS

JP        2003-228840         8/2003

* cited by examiner

*Primary Examiner*—Joseph H Feild
*Assistant Examiner*—Tawfik Goma
(74) *Attorney, Agent, or Firm*—Ditthavong, Mori & Steiner, P.C.

(57) ABSTRACT

In an exemplary embodiment of the present invention, after test write is performed with a predetermined test power to a first track on an optical disk, test write is performed with the same test power as the first track to a second track adjacent to the first track. Then, reproduction signals are obtained by reproducing the first track and the second track respectively, and a determination whether or not the test power is set to a recording laser power in recording main information is made based on a relationship between the obtained reproduction signals.

6 Claims, 12 Drawing Sheets

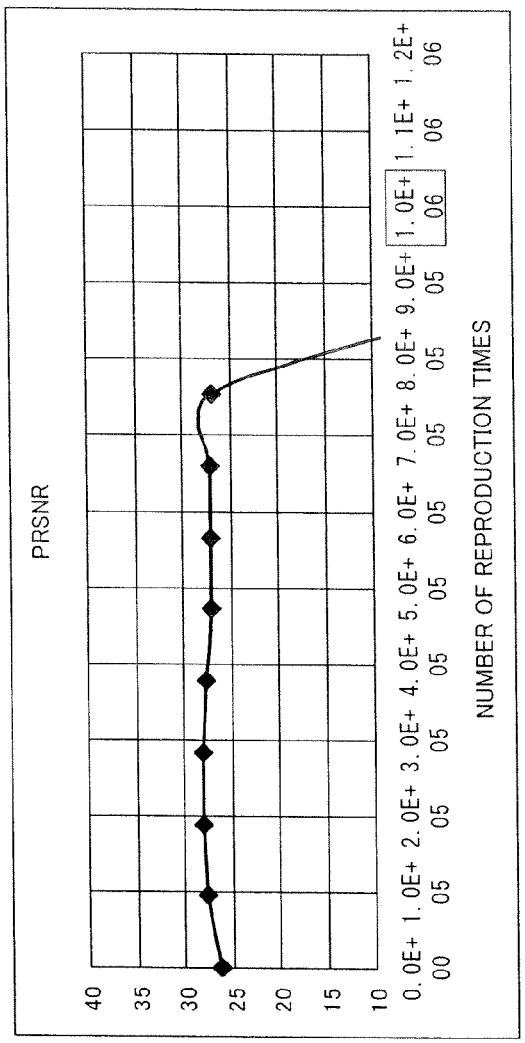
FIG. 5A  COMPARATIVE EXAMPLE
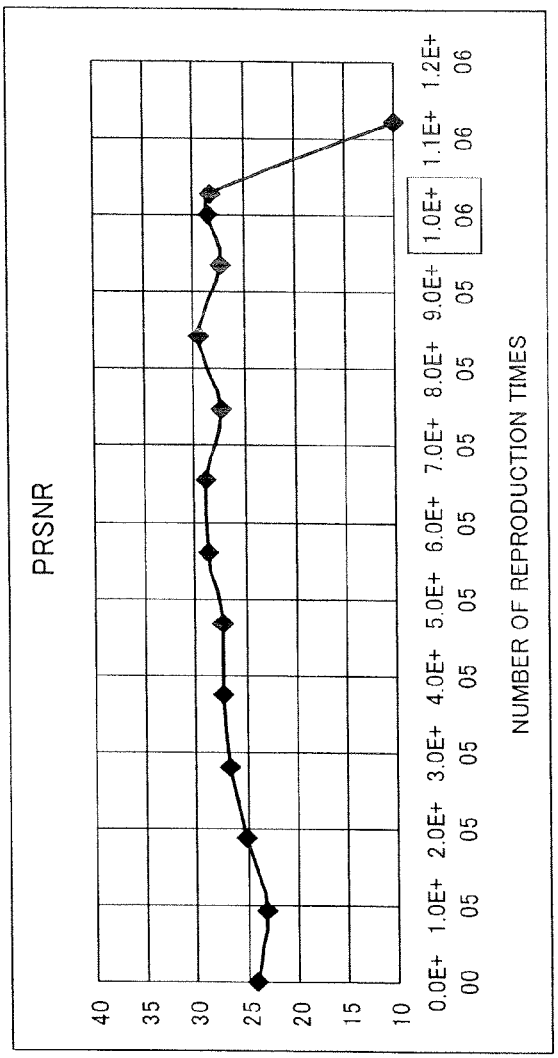
FIG. 5B  EMBODIMENT

RECORDED WITH POWER Pw1

AMPLITUDE WAVEFORM OF
SYSTEM LEAD-IN AREA

RECORDED WITH POWER Pw2

RECORDED WITH PROPER POWER

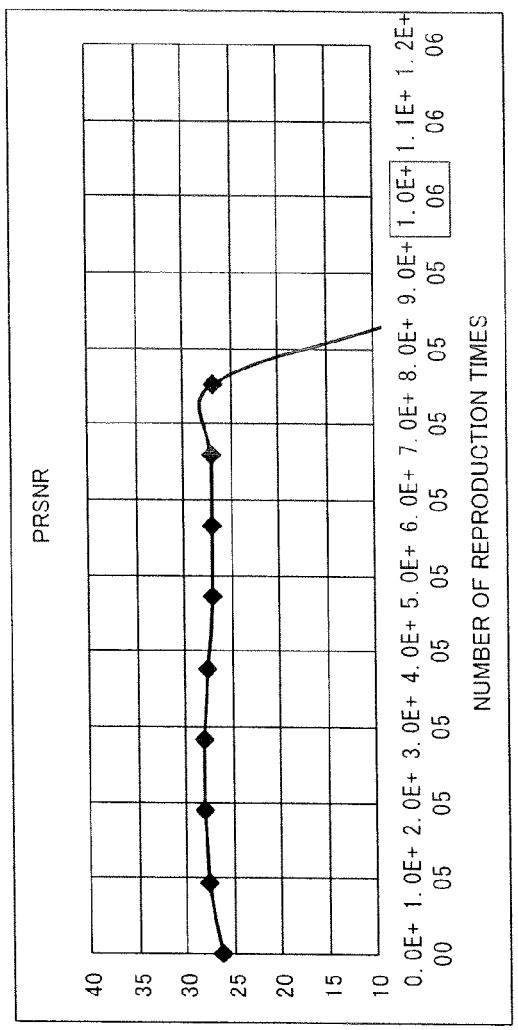
FIG. 10A  COMPARATIVE EXAMPLE
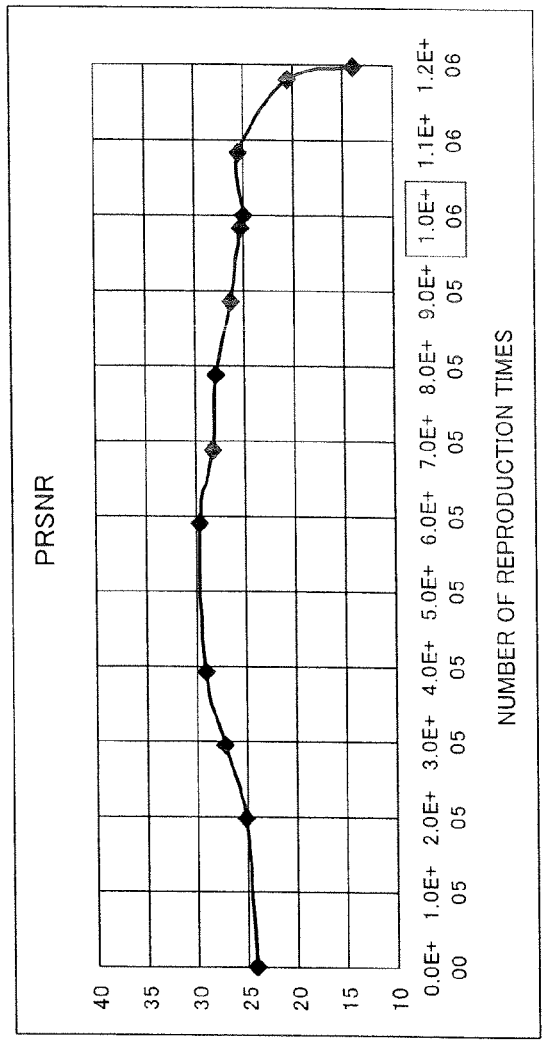
FIG. 10B  EMBODIMENT

LIGHT SPOT

DURING RECORDING OPERATION

LAND
GROOVE

UNRECORDED STATE

OPTICAL DISK APPARATUS

This application claims priority under 35 U.S.C. Section 119 of Japanese Patent Application No. 2006-255099 filed Sep. 20, 2006, entitled "OPTICAL DISK APPARATUS".

BACKGROUND OF THE INVENTION

1. Field of the Invention

The present invention relates to an optical disk apparatus, particularly to the optical disk apparatus which is suitably used to record information in a so-called Low-to-High type optical disk in which a reflectance of a recorded portion is higher than that of an unrecorded portion.

2. Description of the Related Art

Currently, HD DVD-R (High Definition Digital Versatile Disc-Recordable) is being prepared for the market. In HD DVD-R, there is proposed a so-called Low-to-High type optical disk in which the reflectance of the recorded portion is higher than the reflectance of the unrecorded portion.

In such optical disks, because a recording layer is made of an organic coloring material, the Low-to-High type optical disk is easily affected by light from the outside compared with a High-to-Low type optical disk in which the recording layer is made of an inorganic material. On the other hand, at least 1000000-time reproductions are demanded in the HD DVD standard. Even in the Low-to-High type optical disk, it is necessary to ensure high reliability for recording information. Therefore, in the optical disk drive apparatus, it is necessary that a laser power be properly set during recording such that degradation of a recording film property and cross erase are not generated due to excessive light irradiation.

FIGS. 12A and 12B schematically show a recording operation when the information is recorded in the Low-to-High type HD DVD-R. As shown in FIG. 12, as with the High-to-Low type HD DVD-R, the recording is performed only to grooves in the Low-to-High type optical disk. Because the optical disk is not rewritable, the recording is sequentially performed to the track one by one from an inner circumference to an outer circumference of the optical disk.

As shown in FIG. 12B, when the recording is finished to a groove (G1), the recording is performed to a groove (G2) adjacent to the groove (G1). In this case, the recorded groove (G1) is partially irradiated with a periphery of a light spot when the recording is performed to the groove (G2). Laser beam intensity in the light spot concentrates on a central portion of the light spot. Therefore, even if the recorded groove (G1) is partially irradiated with the periphery of the light spot, a recording mark is not formed on the groove (G1).

However, at this point, the laser beam leaks slightly into the groove (G1). The leakage of the laser beam affects the recording layer of the groove (G1) to generate the degradation of the recording layer in terms of light stability. Additionally, when the groove is irradiated with the high-power laser beam in the recording operation, the degradation is generated in the recording film property, which possibly results in a problem of reproduction durability.

Thus, in the Low-to-High type HD DVD-R, it is necessary that the setting of the recording laser power be studied from the standpoint different from the High-to-Low type HD DVD-R.

Generally the recording laser power in a write once read many optical disk is set to a power with which a reproduction signal property becomes the best. For example, in the High-to-Low type HD DVD-R, the recording laser power is determined by a test write performed to a test area such that PRSNR (Partial Response Signal to Noise Ratio) becomes the maximum or a reproduction error rate becomes the minimum, and the laser power is set to record main information.

According to the above method, it can be predicted that the reproduction signal property becomes the best immediately after the recording. However, when the method is directly applied to the Low-to-High type HD DVD-R, the degradation of the recording film property may be generated as described above. Therefore, the sufficient signal property is not possibly obtained before the number of reproduction times defined by the standard. According to the verification performed by the inventor, in the case where the recording is performed with the laser power in which the PRSNR becomes the maximum, PRSNR of the reproduction signal is rapidly degraded when the number of reproduction times reaches about 700000 to about 800000 times, and the 1000000 times reproduction operations defined by the standard cannot be realized. The detailed verification will be described in the following embodiments of the description.

The degradation of the recording film property becomes remarkable in the area which is frequently irradiated with the laser beam. For example, the degradation of the recording film is easily generated in the areas, such as a data lead-in area and an area in which file information is stored, which is read in each time the optical disk is reproduced. However, when the areas cannot be produced, the information necessary to reproduce the main information cannot be obtained. As a result, the information in the whole optical disk cannot be reproduced.

SUMMARY OF THE INVENTION

The present invention is made to solve the above problem. According to the present invention, the recording laser power is properly set for the Low-to-High type optical disk, whereby the degradation of the recording film property is suppressed to enhance the reproduction durability of the optical disk and the reliability of the recording information.

An optical disk apparatus according to a first aspect of the invention includes an optical pickup which irradiates an optical disk with a laser beam; and a recording power setting circuit which sets a recording power of the laser beam, wherein the recording power setting circuit performs test write with a predetermined test power to a first track on the optical disk, performs test write with the same test power as the test write in the first track to a second track adjacent to the first track, reproduces the first track and the second track to obtain reproduction signals respectively, and determines whether or not the test power is set to a recording laser power in recording main information based on a relationship between the obtained reproduction signals.

An optical disk apparatus according to a second aspect of the invention includes an optical pickup which irradiates an optical disk with a laser beam; and a recording power setting circuit which sets a recording power of the laser beam, wherein the recording power setting circuit performs test write with a predetermined test power to a first track on the optical disk, performs test write with the same test power as the test write in the first track to a second track adjacent to the first track, and determines whether or not the test power is set to a recording laser power in recording main information based on a reproduction signal obtained in reproducing the first track.

An optical disk apparatus according to a third aspect of the invention includes an optical pickup which irradiates an optical disk with a laser beam; and a recording power setting circuit which sets a recording power of the laser beam, wherein the recording power setting circuit performs test write with a predetermined test power to a track on the optical disk, reproduces the track after the test write to obtain a first amplitude level of a reproduction signal reproduced from the track, obtains a second amplitude level from a reproduction signal obtained in reproducing an emboss area on the optical disk, and determines whether or not the test power is set to a recording laser power in recording main information based on a condition that the first amplitude level is not more than the second amplitude level.

An optical disk apparatus according to a fourth aspect of the invention includes an optical pickup which irradiates an optical disk with a laser beam; and a recording power setting circuit which sets a recording power of the laser beam, wherein the recording power setting circuit determines the recording power after performing test write to a track on the optical disk, and an amplitude level of a reproduction signal obtained from an area where recording is performed with the determined recording power is lower than an amplitude level of a reproduction signal obtained in reproducing an emboss area of the optical disk.

BRIEF DESCRIPTION OF THE DRAWINGS

The above and other objects and novel features of the invention will become more fully apparent from the following description of embodiments with reference to the accompanying drawings. However, the drawings are used for the purpose of illustration only, and the drawings are not intended to restrict the scope of the invention.

FIGS. 5A and 5B show verification results of comparative example and the first embodiment respectively;

FIGS. 10A and 10B show verification results of comparative example and the second embodiment respectively;

DESCRIPTION OF THE PREFERRED EMBODIMENTS

Preferred embodiments of the present invention will be described below with reference to the drawings. In the embodiments, the present invention is applied to an optical disk apparatus in which the recording and reproduction are performed to the Low-to-High type HD DVD-R.

Figure 1:
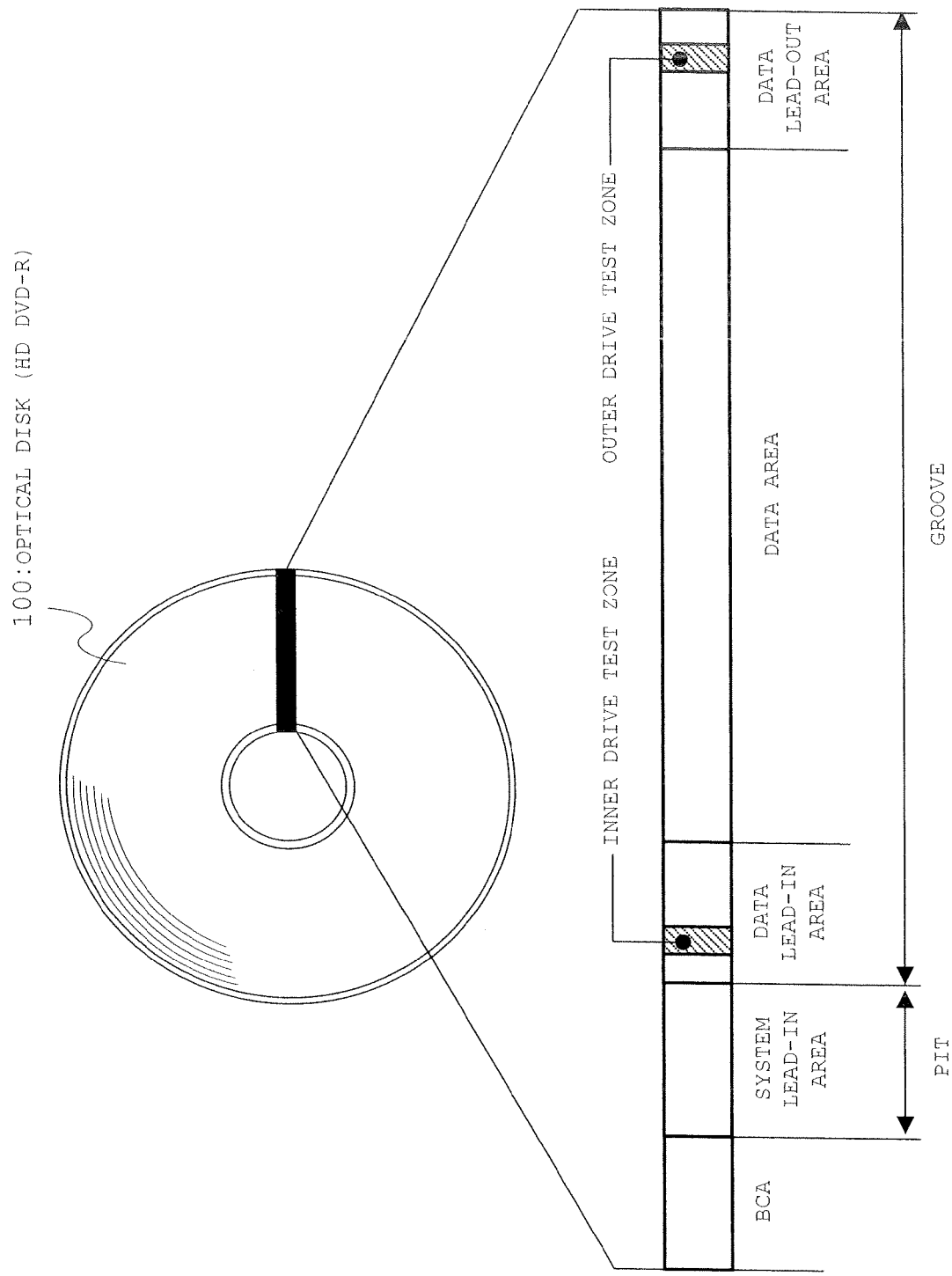
FIG. 1 shows an area format of an optical disk according to an exemplary embodiment of the present invention.

FIG. 1 shows an area format of an optical disk 100 according to an exemplary embodiment of the present invention.

Referring to FIG. 1, the optical disk 100 is divided in a disk radial direction into BCA (Burst Cutting Area), a system lead-in area, a data lead-in area, a data area, and a data lead-out area. The data lead-in area and the data lead-out area are divided into various zones. A recording laser power setting operation is performed using an inner drive test zone and an outer drive test zone in the zones.

A corresponding written standard number and a disk type are recorded in BCA. In loading the optical disk, the optical disk apparatus can read BCA to detect the disk type. In addition to the corresponding written standard number and the disk type, information on recording and reproduction of the optical disk is recorded in the form of pits in a system lead-in area. The information includes a recording speed adapted to the optical disk, a reflectance, optimum recording and reproduction powers, a write strategy, recording area setting, and identification information on an optical disk manufacturing company. In loading the optical disk, the optical disk apparatus reproduces the system lead-in area to obtain the information necessary for the recording and reproduction in addition to the disk type.

A pit forming area (system lead-in area) and a groove forming area (data lead-in area, data area, and data lead-out area) have the same film structure. That is, as with the groove forming area, a recording film and a reflecting film are formed in the pit forming area.

Figure 2:
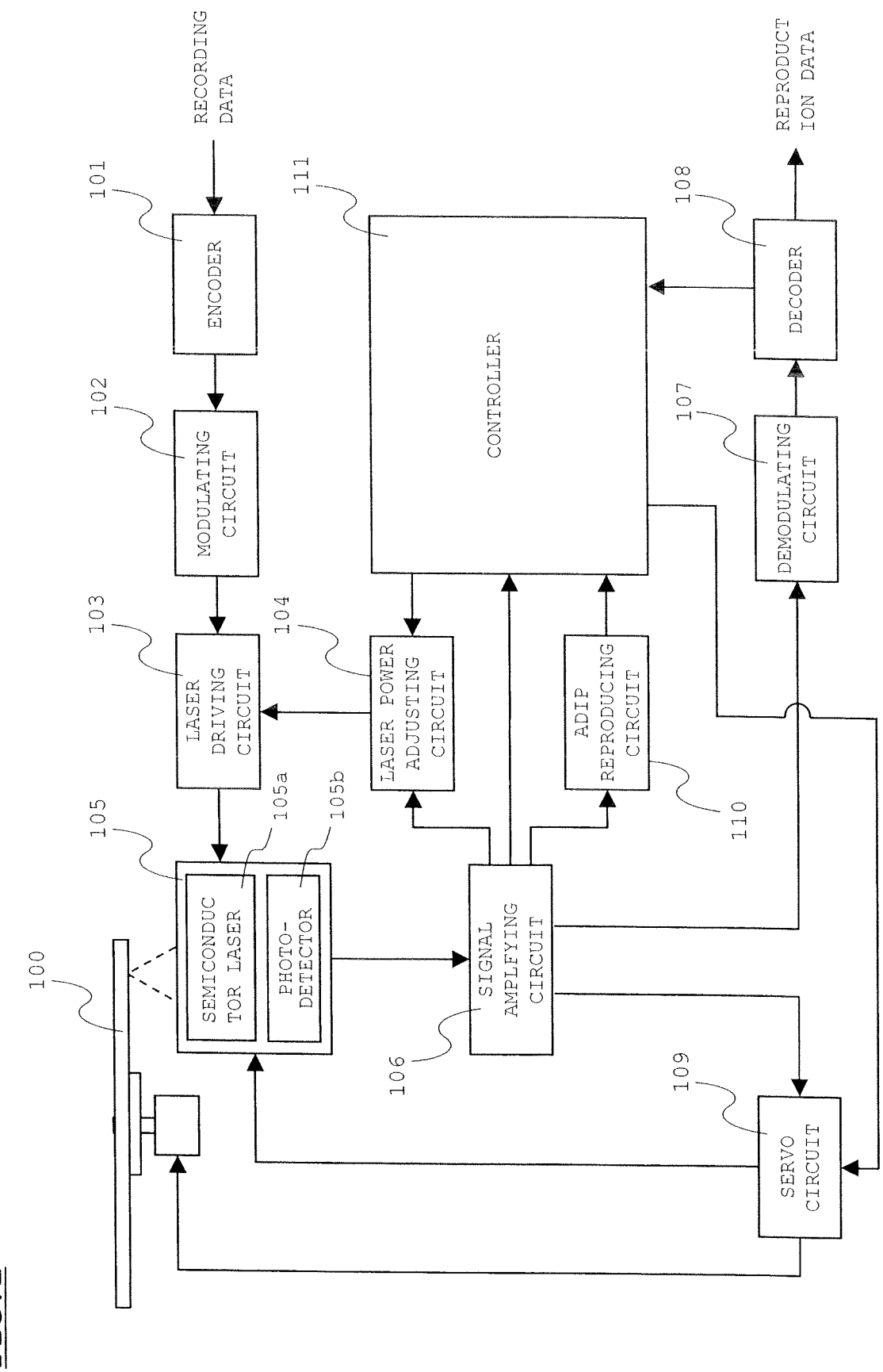
FIG. 2 shows a configuration of an optical disk apparatus according to an exemplary embodiment of the present invention.

FIG. 2 shows a configuration of an optical disk apparatus according to an exemplary embodiment of the present invention.

Referring to FIG. 2, the optical disk apparatus includes an encoder 101, a modulating circuit 102, a laser driving circuit 103, a laser power adjusting circuit 104, an optical pickup 105, a signal amplifying circuit 106, a demodulating circuit 107, a decoder 108, a servo circuit 109, an ADIP reproducing circuit 110, and a controller 111.

An actuator for moving the optical pickup 105 in the disk radial direction is neglected in FIG. 2. The driving of the actuator is controlled by a servo signal inputted from the servo circuit 109. The controller 111 appropriately outputs a command signal to the servo circuit 109 in setting a recording laser power.

In FIG. 2, the encoder 101 performs an encoding process such as addition of an error correction code to the inputted recording data, and the encoder 101 outputs the encoded recording data to the modulating circuit 102. The modulating circuit 102 performs a predetermined modulation to the inputted recording data, and the modulating circuit 102 generates a recording signal and outputs the recording signal to the laser driving circuit 103. The laser driving circuit 103 outputs a driving signal to a semiconductor laser 105a according to the recording signal from the modulating circuit 102 during the recording, and the laser driving circuit 103 outputs a driving signal to the semiconductor laser 105a to emits a laser beam having constant strength during the reproduction. During the recording and reproduction, the laser beam is controlled by a signal from the laser power adjusting circuit 104. The laser power adjusting circuit 104 outputs a signal to the laser driving circuit 103 to regulate the laser powers during the recording and reproduction according to the command from the controller 111.

The optical pickup 105 includes the semiconductor laser 105a and a photodetector 105b. The optical pickup 105 causes the laser beam to converge on the groove to perform the data write and read to the optical disk. The optical pickup 105 also includes an objective lens actuator and an optical system. The objective lens actuator adjusts the state in which the groove is irradiated with the laser beam. The optical system guides the laser beam emitted from the semiconductor laser 105a, and the optical system guides the light reflected from the optical disk 100 to the photodetector 105b.

The signal amplifying circuit 106 amplifies the signal received from the photodetector 105b, the signal amplifying circuit 106 performs a computation process to the signal to generate various signals, and the signal amplifying circuit 106 outputs the signals to corresponding circuits. The demodulating circuit 107 generates reproduction data by demodulating a reproduction RF signal inputted from the signal amplifying circuit 106, and the demodulating circuit 107 outputs the reproduction data to the decoder 108. The decoder 108 performs a decoding process such as error correction to the data inputted from the demodulating circuit 107, and the decoder 108 outputs the decoded data to a subsequent circuit.

The servo circuit 109 generates a focus servo signal and a tracking servo signal from a focus error signal and a tracking error signal which are inputted from the signal amplifying circuit 106, and the servo circuit 109 outputs the focus error signal and tracking error signal to the objective lens actuator in the optical pickup 105. The servo circuit 109 also generates a motor servo signal from a wobble signal inputted from the signal amplifying circuit 106, and the servo circuit 109 outputs the motor servo signal to a disk driving motor. The ADIP reproducing circuit 110 reproduces address information from the wobble signal inputted from the signal amplifying circuit 106, and the ADIP reproducing circuit 110 outputs the address information to the controller 111.

The controller 111 stores various pieces of data in a built-in memory, and the controller 111 controls each unit according to a previously-set program. Information for regulating an initial power during test write is retained in the built-in memory in the controller 111. For example, in the information, an optical disk manufacturing company can be associated with the initial power. In this case, the controller 111 reads the information on the optical disk manufacturing company from the system lead-in area, and the controller 111 obtains the initial power corresponding to the optical disk manufacturing company from the built-in memory to set the initial power during the test write.

Instead, a factor ν for correcting an optimum recording power recorded in the system lead-in area may be stored in the built-in memory while associated with the optical disk manufacturing company. In this case, the controller 111 reads the information on the optimum recording power and optical disk manufacturing company recorded in the system lead-in area, the controller 111 obtains the factor ν corresponding to the read optical disk manufacturing company from the built-in memory, and the controller 111 computes the initial power during the test write by multiplying the obtained factor ν by the optimum recording power read from the system lead-in area.

Sometimes the optical disk manufacturing company obtained from the system lead-in area does not exist in the built-in memory. Therefore, the initial power or a default value of the factor ν is stored in the built-in memory. In the case where the optical disk manufacturing company obtained from the system lead-in area does not exist in the built-in memory, the controller 111 sets the initial power during the test write using the initial power or the default value of the factor ν stored in the built-in memory.

The initial power or the default value of the factor ν stored in the built-in memory is set such that the initial power during the test write is smaller than the optimum recording power recorded in the system lead-in area. Accordingly, the initial test write in setting the recording power is suppressed lower than the optimum recording power set by the optical disk manufacturing company.

First Embodiment

A recording power setting method will be described with reference to FIGS. 3A and 3B.

Figure 3A:
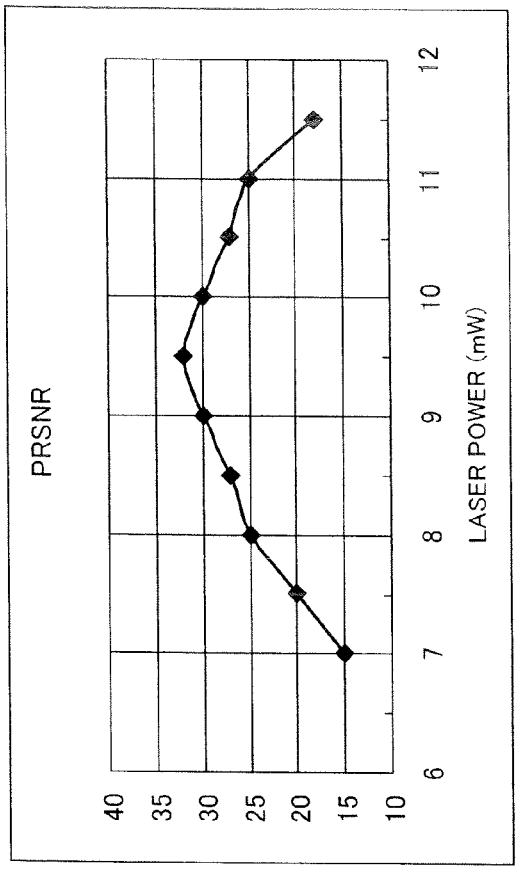
FIGS. 3A and 3B are views explaining a method of setting recording power according to a first embodiment of the present invention.

FIG. 3A show measurement result when a track was reproduce to measure PRSNR after the recording is performed in a track (groove) on a sample disk (Low-to-High type HD DVD-R). A vertical axis indicates a recording laser power and a horizontal axis indicates PRSNR.

In the measurement, the track was irradiated with the laser beam with the laser power at each plotted point, and the recording was performed to the track. The PRSNR measurement was performed with an optical disk drive evaluation unit (type ODU-1000) produced by Plustec Industrial Co., Ltd. In the measurement, a disk linear velocity was set to 6.61 m/s (constant), and a reproduction laser power was set to 0.4 mW.

In the conventional recording power setting method, a recording power Pw is set to the power at which PRSNR becomes the maximum. In the measurement example of FIG. 3A, the recording power Pw was set to about 9.5 mW.

Figure 3B:
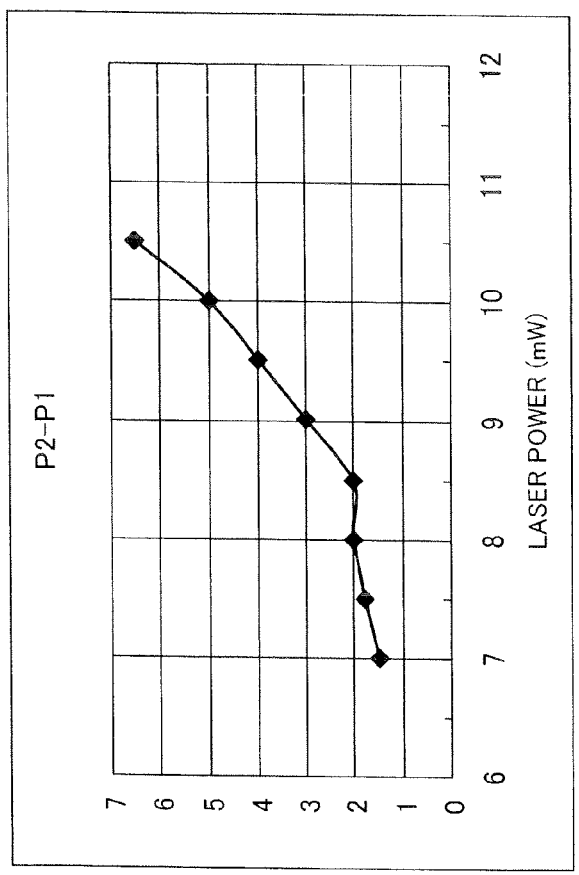

FIG. 3B shows measurement result when a difference in PRSNR between the two adjacent tracks was measured by the following procedure.

i) After the recording was performed to a track (groove) T1 on the sample disk with a recording power Pwt, the recording was performed to a track T2 with the same recording power Pwt.

ii) Then, the recorded portion in the track T2 was reproduced to determine PRSNR (P2), and the recorded portion in the track T1 was reproduced to obtain PRSNR (P1).

iii) The difference between P2 and P1 was determined.

In FIG. 3B, the vertical axis indicates a recording laser power Pwt and the horizontal axis indicates the difference between P2 and P1. The measurement was performed while the recorded portion of the track T1 and the recorded portion of the track T2 lined substantially completely in a disk radial direction. Furthermore, in the measurement, the same sample disk as that of FIG. 3A was used. The measuring machine and the measurement conditions was identical to those of FIG. 3A.

In the measurement, the laser beam leaks into the recorded portion of the track T1 when the recording is performed to the track T2, and the signal property is degraded in the recorded portion of the track T1 due to the leakage of the laser beam. A degree of the degradation can be evaluated by magnitude of the difference between P2 and P1.

Referring to the measurement result of FIG. 3B, the difference between P2 and P1 is rapidly increased around a portion where the recording laser power exceeds 8.5 mw. Accordingly, in the measurement example of FIG. 3B, when the recording laser power is increased more than 8.5 mW, it can be predicted that the signal degradation becomes prominent in the already-recorded track to decrease the reproduction durability of the optical disk. That is, on the basis of the measurement result of FIG. 3A, when the recording laser power is set to about 9.5 mW at which PRSNR becomes the maximum, it can be predicted that the signal degradation becomes prominent in the already-recorded track to decrease the reproduction durability of the optical disk.

In the first embodiment, the difference between P2 and P1 is monitored during the test write in setting the recording laser power, and the recording laser power Pw in recording main information is set lower than a range where difference between P2 and P1 is rapidly changed. Specifically an upper limit value Pd-sh is set for a difference Pd between P2 and P1, and the recording laser power Pw is set in the range where Pd=<Pd-sh is satisfied. For example, in the case of FIG. 3B, when the upper limit value Pd-sh is set to two, the recording laser power setting range is set lower than 8.5 mW. The recording laser power is appropriately set from the recording laser power setting range.

Figure 4:
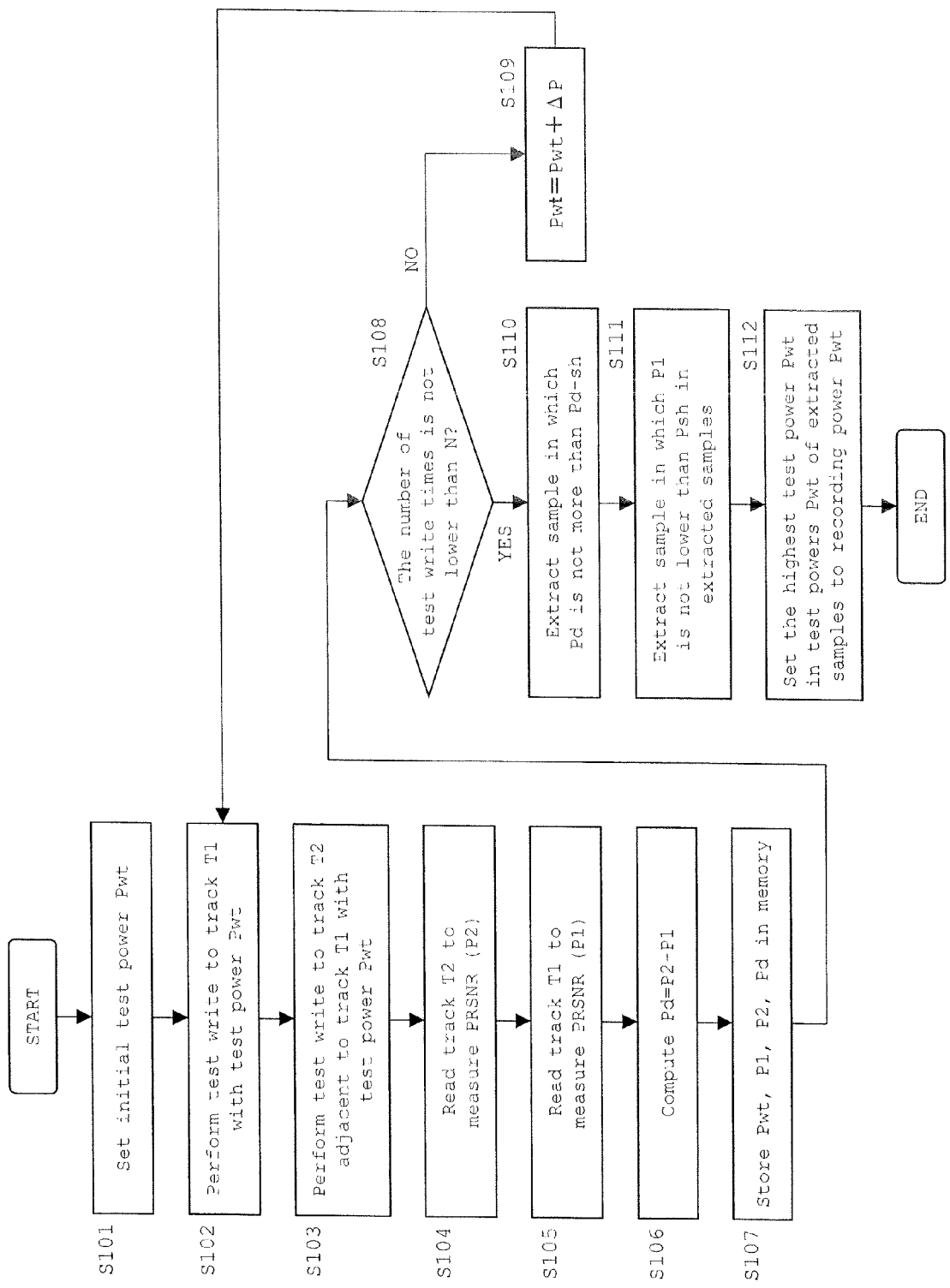
FIG. 4 is a process flowchart in setting the recording power according to the first embodiment.

FIG. 4 is a process flowchart in setting the recording power.

When the recording laser power setting process is started, the recording power Pwt during the test write (hereinafter referred to as "test power") is set to an initial power (S101). As described above, the initial power setting is performed by reading the initial power or the factor v from the built-in memory in the controller.

When the test power Pwt is set, the optical pickup 105 is delivered to the inner drive test zone or the outer drive test zone (hereinafter referred to as "test zone"), and the test write is performed to the track T1 in the test zone with the test power Pwt (S102). Moreover, when the test write is finished, the test write is performed to the track T2 adjacent to the track T1 with the same test power Pwt (S103). The test write is performed while the test write portion of the track T1 and the test write portion of the track T2 line substantially completely in the disk radial direction.

When the test write is finished for S102 and S103, the test write portions of the tracks T2 and T1 are sequentially reproduced to obtain PRSNR (P2) and PRSNR (P1) (S104 and S105). The difference Pd between P2 and P1 is determined from computation of Pd=P2-P1 (S106), and the determined difference Pd, PRSNR P1, PRSNR P2, and the test power Pwt are stored in the memory (S107).

Then, it is determined whether or not the number of test write times reaches the number of predetermined set times in setting the recording power (S108). When the number of test write times does not reach the number of predetermined set times (NO in S108), the test power Pwt is increased by ΔP (S109), and the flow returns to S102 to perform the processes from S102. Therefore, PRSNR P1, PRSNR P2, and the difference Pd are determined in performing the test write with the new test power Pwt, and PRSNR P1, PRSNR P2, and the difference Pd are stored in the memory along with the new test power Pwt (S102 to S107).

The processes S102 to S107 are repeated until the number of test write times reaches the number of predetermined set times N. Therefore, the N samples having sets of the test powers Pwt, PRSNRs P1, PRSNRs P2, and the differences Pd are determined and stored in the memory.

When the N samples are stored in the memory (YES in S108), the samples in which the difference Pd is not more than the predetermined upper limit value Pd-sh are extracted from the N samples (S110). The samples, in which PRSNR P1 is not lower than a predetermined threshold Psh of PRSNR, are extracted from the extracted samples (S111), and the highest test power Pwt in the test powers Pwt of the extracted samples extracted in the step S111 is set to the recording power Pw (S112).

The threshold Psh is set more than 15. This is because, in the case where the PRSNR is not more than 15, an error is frequently generated in reproduction data and the error is difficult to be correct by the error correction in the signal processing system. Actually, the threshold Psh is preferably set to about 20 in consideration of a fluctuation in signal property over the optical disk surface and system stability.

The upper limit value Pd-sh is set based on the result in which characteristics of the Low-to-High type HD DVD-R are verified to various optical disks.

According to the first embodiment, the test write is performed to the two adjacent tracks, and the recording power Pw in recording the main information is set from the states of the reproduction signals obtained from the two tracks. Therefore, the recording power is set in consideration of the degradation of the signal property in the already-recorded tracks due to the leakage of the laser beam.

According to the first embodiment, the recording power Pw is set such that the PRSNR P1 is not lower than the threshold Psh, so that the reproduction signal property can be prevented from falling down to a level at which the signal processing system cannot cope with the reproduction signal property.

Particularly, according to the first embodiment, the highest test power Pwt in the test powers Pwt in which the PRSNR P1 is not lower than the threshold Psh is set to the recording power Pw in S112 of FIG. 4, so that the recording power Pw can be brought close to the recording power with which PRSNR becomes the maximum. Generally, the relationships shown in FIGS. 3A and 3B hold between PRSNR and the difference Pd (P2-P1). As can be seen from comparison of FIGS. 3A and 3B, the set of test powers Pwt in which PRSNR P1 is not lower than the threshold Psh is lower than the recording power with which PRSNR becomes the maximum. Accordingly, in S112 of FIG. 4, the set recording power Pw can be brought close to the recording power with which PRSNR becomes the maximum by selecting the highest test power Pwt from the set of test powers Pwt in which PRSNR P1 is not lower than the threshold Psh. This enables the good reproduction signal property to be realized.

According to the first embodiment, the recording power is suppressed to a level lower than the recording power with which PRSNR becomes the maximum, so that the degradation of the recording film property can be suppressed. Therefore, according to the first embodiment, the optical disk durability can be enhanced compared with the case in which the recording power is set such that PRSNR becomes the maximum.

FIGS. 5A and 5B show verification results of disk durability. FIG. 5A shows verification result when the recording power is set such that PRSNR becomes the maximum, and FIG. 5B shows verification result when the recording power is set according to the first embodiment. In FIG. 5, the horizontal axis indicates the number of reproduction times and the vertical axis indicates PRSNR.

The verification was performed using the sample disk similar to that of FIGS. 3A and 3B. In the verification example of FIG. 5A, the recording power Pw was set to 9.5 mW with which PRSNR became the maximum based on the measurement result of FIG. 3A. In the verification example of FIG. 5B, the recording power Pw was set to 8.5 mW based on the measurement result of FIG. 3B. The recording power of 8.5 mW was the recording power of the sample whose PRSNR P1 became the maximum in the four samples in which the difference P2-P1 was not more than two.

In each verification example, the recording was sequentially performed from the disk inner circumference with the recording power set in the above-described manner, and the two adjacent tracks which were in the recorded state were selected and repeatedly reproduced. The optical disk drive evaluation unit (type ODU-1000) produced by Plustec Industrial Co., Ltd. was used as the measuring machine. In the measurement, the disk linear velocity was set to 6.61 m/s (constant), and the reproduction laser power was set to 0.4 mW.

As can be seen from FIGS. 5A and 5B, the comparative example is higher than the first embodiment in PRSNR when the number of reproduction times is small. However, in the comparative example, PRSNR is rapidly decreased when the number of reproduction times exceeds about 700000 times, and PRSNR is lower than 15 and becomes not reproducible when the number of reproduction times exceeds about 800000 times. That is, the comparative example cannot satisfy the number of reproduction times of 1000000 times defined in the standard.

On the other hand, in the first embodiment, PRSNR is maintained at a level not lower than 25 even if the number of reproduction times exceeds about 800000 times, and PRSNR can be maintained at a level not lower than 25 when the number of reproduction times reaches 1000000 times. That is, the first embodiment can satisfy the number of reproduction times of 1000000 times defined in the standard. According to the first embodiment, PRSNR tends to increase when the number of reproduction times exceeds about 100000 times, and PRSNR becomes higher than PRSNR of the comparative example when the number of reproduction times exceeds about 500000 times.

Thus, according to the first embodiment, the number of reproducible times can remarkably be lengthened to the number of times demanded in the standard while PRSNR is maintained at a high level. Therefore, according to the first embodiment, the optical disk durability and the data reliability can remarkably be enhanced.

In the first embodiment, the test power Pwt of the sample in which PRSNR P1 becomes the maximum is set to the recording power Pw in the group of samples of P2−P1=<Pd−sh. Alternatively, the test power Pw of the sample except for the sample in which PRSNR P1 becomes the maximum may be set to the recording power Pw. However, in this case, because the set recording power Pw is separated from the recording power in which PRSNR P1 becomes the maximum compared with the first embodiment, it can be predicted that PRSNR becomes lower compared with the first embodiment at least while the number of reproduction times is small.

In the first embodiment, after the test write is performed to the two tracks N times to obtain N samples, the determinations of Pd=<Pd−sh and P1>=Psh are made. Alternatively, the determinations of Pd=<Pd−sh and P1>=Psh may be made in each time the test write is performed to the two tracks. In this case, the test write is performed until Pd=<Pd−sh and P1>=Psh are satisfied, and the test write is not performed after Pd=<Pd−sh and P1>=Psh are satisfied. The test power Pwt in satisfying Pd=<Pd−sh and P1>=Psh is set to the recording power.

Figure 6:
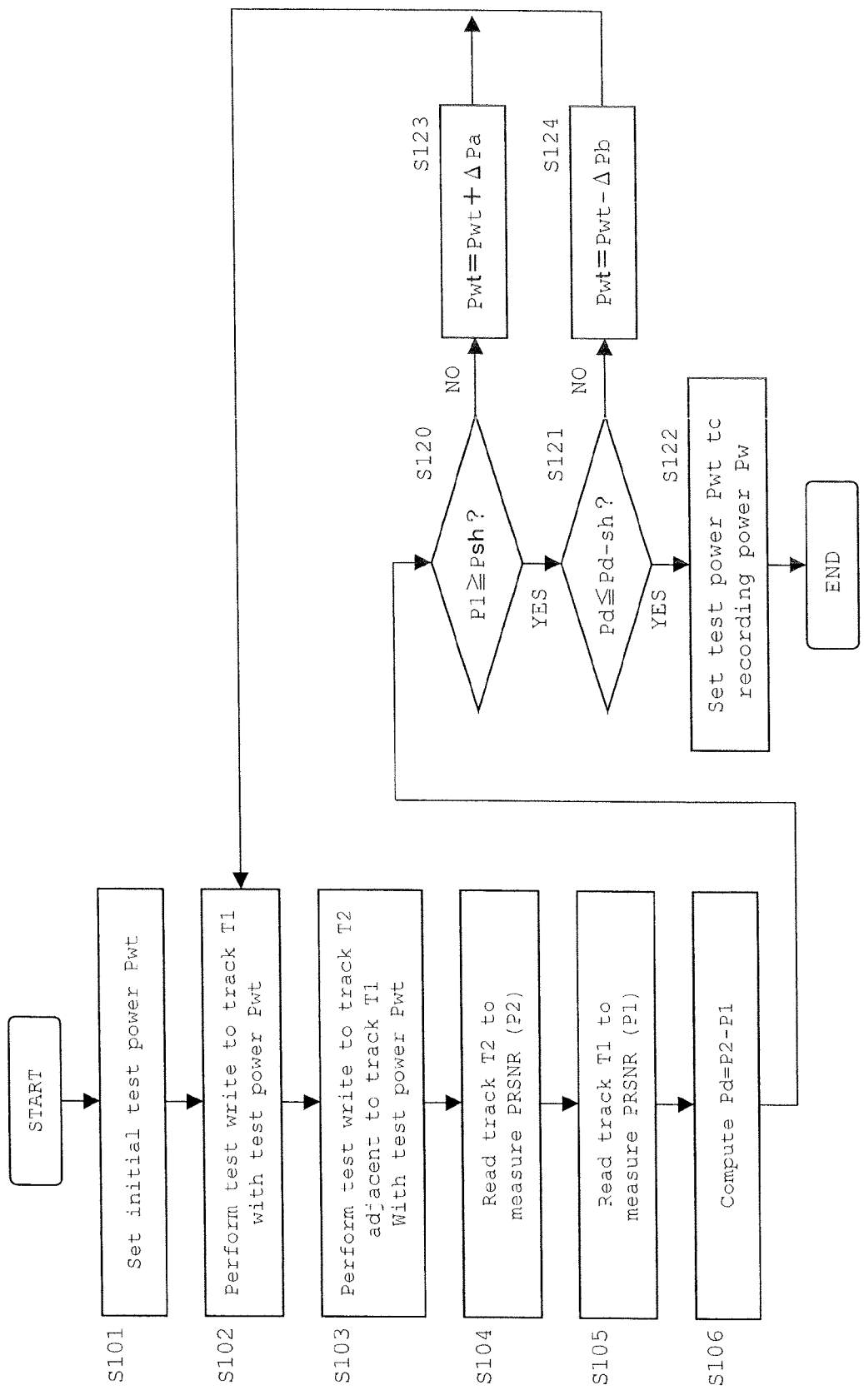
FIG. 6 shows a modification of the process flowchart in setting the recording power according to the first embodiment.

In such cases, the process flowchart is changed as shown in FIG. 6. In the flowchart of FIG. 6, the processes from S107 of FIG. 4 are changed. That is, when the test write is performed to the two tracks to obtain the difference Pd between PRSNR (P1) and PRSNR (P2) in S101 to S106 as described above, a determination whether or not PRSNR P1 is not lower than the threshold Psh is made (S120). When PRSNR P1 is not lower than the threshold Psh (YES in S120), a determination whether or not the difference Pd is not more than the upper limit value Pd−sh is further made (S121). When the difference Pd is not more than the upper limit value Pd−sh (YES in S121), the test power Pwt at that time is set to the recording power Pw (S122).

On the other hand, when PRSNR P1 is lower than the threshold Psh (NO in S120), the test power Pwt is increased by ΔPa (S123), and the flow returns to S102 to perform the processes from S102. When PRSNR P1 is not lower than the threshold Psh while the difference Pd is more than the upper limit value Pd−sh (NO in S121), the test power Pwt is decreased by ΔPb (S124), and the flow returns to S102 to perform the processes from S102. PRSNR P1, PRSNR P2, and the difference Pd are determined through these processes when the test write is performed with the new test power Pwt. The conditions of S120 and S121 are evaluated based on the determined PRSNR P1, PRSNR P2, and difference Pd.

In the process flowchart of FIG. 6, because the recording power is set by the test writes not more than N times, useless test writes can be avoided to quickly perform the recording power setting process. However, in the process flowchart of FIG. 6, the set recording power Pw is highly likely separated from the recording power in which PRSNR becomes the maximum compared with the process flowchart of FIG. 4. Therefore, it can be predicted that PRSNR becomes lower compared with the case of FIG. 4 at least while the number of reproduction times is small.

Second Embodiment

A recording power setting method according to a second embodiment of the present invention will be described below with reference to FIGS. 7A to 7D.

Figure 7A:
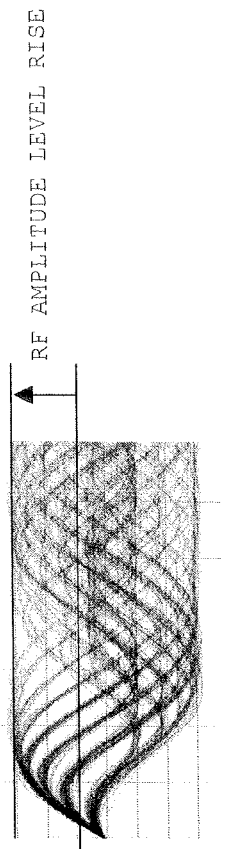
FIGS. 7A to 7D are views explaining a method of setting recording power according to a second embodiment of the present invention.
Figure 7C:
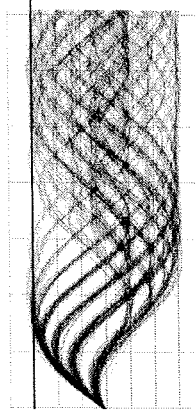
Figure 7B:
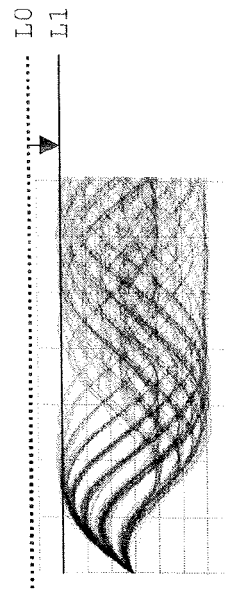

FIGS. 7A and 7B show reproduction RF signals when the recording is performed to the same Low-to-High type HD DVD-R with recording powers Pw1 and Pw2 (Pw2>Pw1) respectively. As shown in FIGS. 7A and 7B, in the Low-to-High type HD DVD-R, a reproduction RF signal level rises with the degradation of the recording film property. Accordingly, an evaluation whether or not the recording power is proper can be made based on the reproduction RF signal level. That is, when the reproduction RF signal level exceeds a predetermined threshold level, it is evaluated that the recording power is excessive. When the reproduction RF signal level is not more than the threshold level, it is evaluated that the recording power is proper.

In the second embodiment, the reproduction RF signal obtained in reproducing the system lead-in area (pit forming area) is used as the threshold level for evaluating the reproduction RF signal level. As described above, because the system lead-in area has the same layer structure as the data area, the reproduction RF signal obtained from the system lead-in area reflects a film property of the optical disk. Accordingly, when the reproduction RF signal obtained in reproducing the system lead-in area is used as the threshold level for evaluating the reproduction RF signal level during the test write, the recording power can be set according to the film property of the optical disk.

Because the recording is not performed in the system lead-in area, the film property of the system lead-in area does not fluctuate by the laser beam irradiation with the recording power. Furthermore, the information on the system lead-in area is duplicated in the data lead-in area, and usually the information duplicated in the data lead-in area is referred to during the recording and reproduction operations. Therefore, the number of times in which the system lead-in area is irradiated with the laser beam of the reproduction power is small, so that the film property of the system lead-in area does not largely fluctuate by the laser beam irradiation with the reproduction power. Thus, because the film property of the system lead-in area is hardly affected by the recording and reproduction operations, the reproduction RF signal level obtained from the system lead-in area becomes proper as the threshold level for evaluating the reproduction RF signal level during the test write.

Figure 7D:
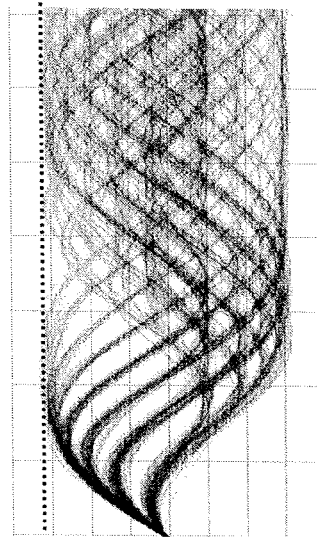

FIG. 7C shows a reproduction RF signal waveform in reproducing the system lead-in area, and FIG. 7D shows a reproduction RF signal waveform in reproducing the area where the recording is performed with the proper power. In the second embodiment, as shown in FIGS. 7C and 7D, when a reproduction RF signal level L1 obtained during the test write is smaller than a reproduction RF signal level L0 obtained from the system lead-in area, the test power Pwt during the test write is set to the recording power Pw.

Figure 8:
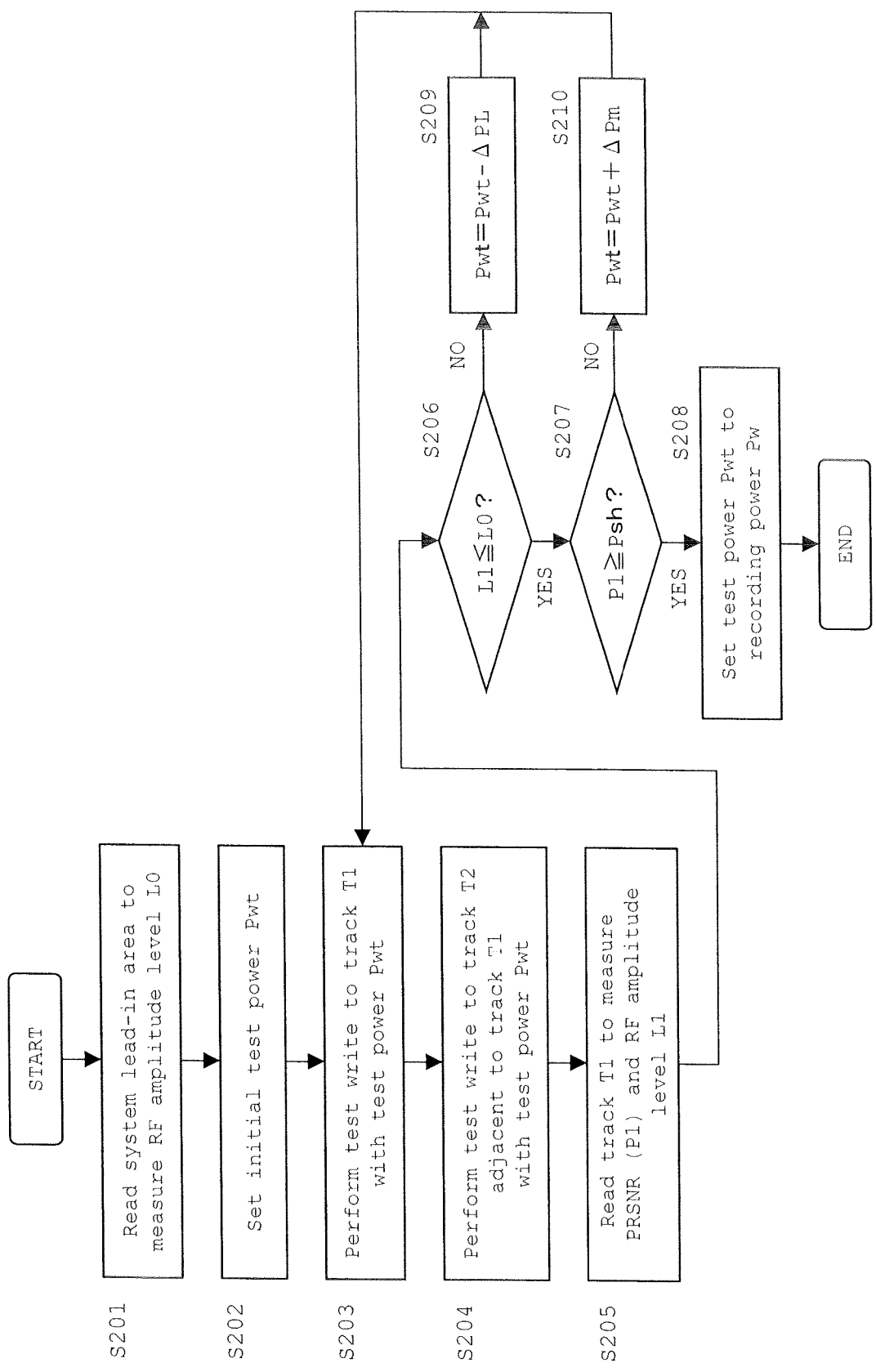
FIG. 8 is a process flowchart in setting the recording power according to the second embodiment.

FIG. 8 is a process flowchart in setting the recording power according to the second embodiment.

When the recording laser power setting process is started, the system lead-in area is read with the laser beam of the reproduction power to obtain the reproduction RF signal level L0 (S201). Then, similarly to the first embodiment, the test power Pwt is set to the initial power (S202).

Then, the optical pickup 105 is delivered to the test zone, and the test write is performed to the track T1 in the test zone with the test power Pwt (S203). Moreover, when the test write is finished, the test write is also performed to the track T2 adjacent to the track T1 with the same test power Pwt (S204). The test write is performed while the test write portion of the track T1 and the test write portion of the track T2 line substantially completely in the disk radial direction.

When the test write is finished for S203 and S204, the test write portion of the track T1 are reproduced to obtain the reproduction RF signal level L1 and PRSNR (P1) (S205). The obtained reproduction RF signal level L1 is compared to the reproduction RF signal level L0 of the system lead-in area obtained in S201 (S206). When the reproduction RF signal level L1 is not more than the reproduction RF signal level L0 (YES in S206), the determination whether or not PRSNR P1 is not lower than the threshold Psh is made (S207). When PRSNR P1 is not lower than the threshold Psh (YES in S207), the test power Pwt at that time is set to the recording power Pw (S208).

On the other hand, when the reproduction RF signal level L1 is more than the reproduction RF signal level L0 (NO in S206), the test power Pwt is decreased by ΔPL (S209), and the flow returns to S203 to perform the processes from S203. When the reproduction RF signal level L1 is not more than the reproduction RF signal level L0 while PRSNR P1 is lower than the threshold Psh (NO in S207), the test power Pwt is increased by ΔPm (S210), and the flow returns the S203 to perform the processes from S203. PRSNR P1 and the reproduction RF signal level L1 are determined through these processes when the test write is performed with the new test power Pwt. The conditions of S206 and S207 are evaluated based on the determined PRSNR P1 and L1.

As with the first embodiment, the threshold Psh in S207 is set more than 15. This is because, in the case where the threshold Psh is set not more than 15, an error is frequently generated in reproduction data and the error is difficult to be correct by the error correction in the signal processing system. Actually, the threshold Psh is preferably set to about 20. Although the reproduction RF signal level L0 is used as the threshold in S206, a value in which a factor lower than one is multiplied by the reproduction RF signal level L0 may be used as the threshold. At this point, for example, the factor may be changed in each optical disk manufacturing company. In this case, the factor is previously stored in the built-in memory of the controller 111. The factor is set based on the result in which the characteristics of the Low-to-High type HD DVD-R are verified in each optical disk manufacturing company.

Figure 9:
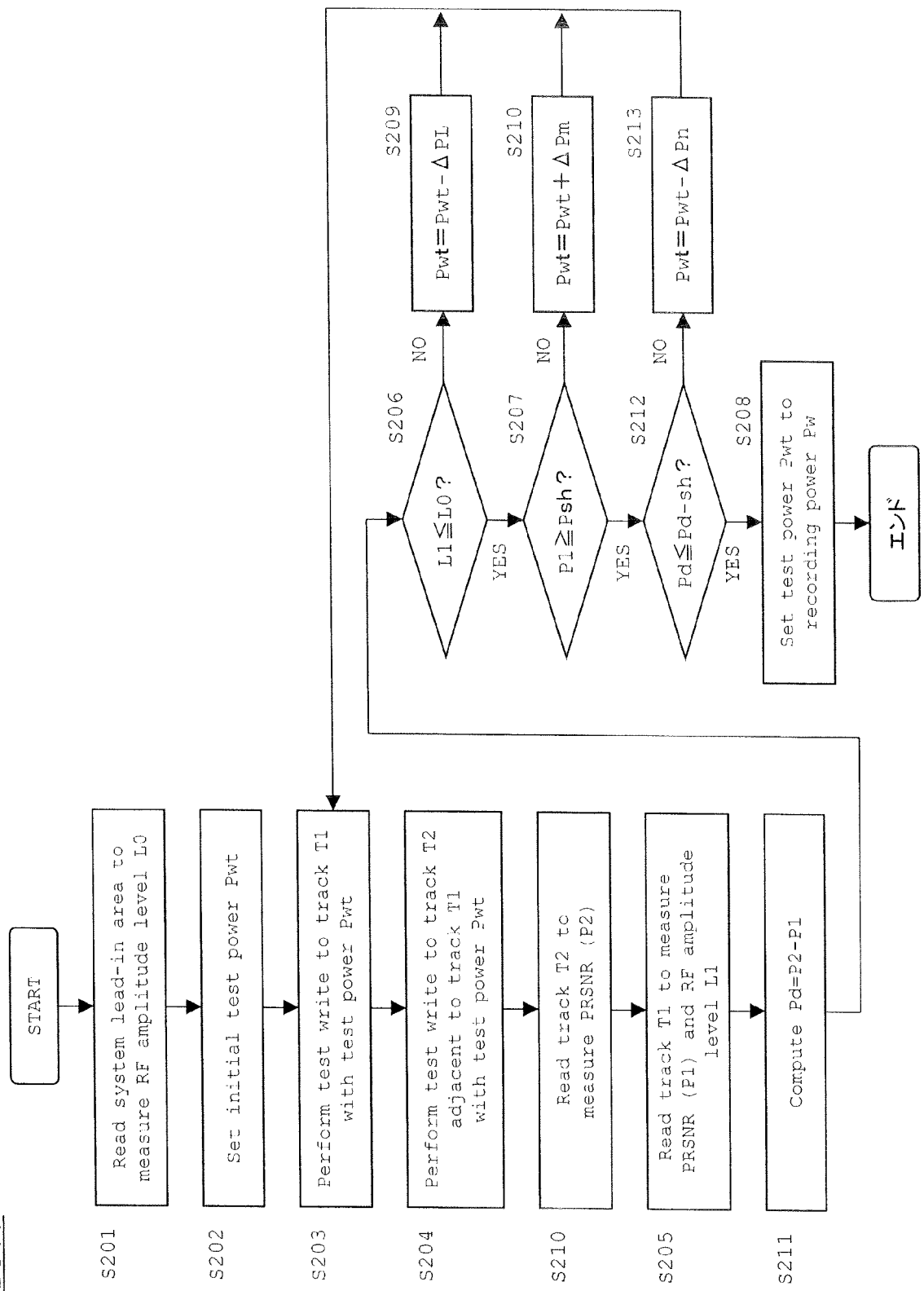
FIG. 9 shows a modification of the process flowchart in setting the recording power according to the second embodiment.

FIG. 9 shows a flowchart in which the evaluation factors of the first embodiment are added to the flowchart of FIG. 8.

Referring to FIG. 9, when the test write is finished for the tracks T1 and T2 in S201 to 204, the test write portion of the track T2 is reproduced to obtain PRSNR (P2) (S210). Then, the test write portion of the track T1 is reproduced to obtain the reproduction RF signal level L1 and PRSNR (P1) (S205). The difference PD between PRSNR P2 and PRSNR P1 is determined by the computation of Pd=P2−P1 (S211).

Then, the obtained reproduction RF signal level L1 is compared with the reproduction RF signal level L0 of the system lead-in area obtained in S201 (S206). When the reproduction RF signal level L1 is not more than the reproduction RF signal level L0 (YES in S206), the determination whether or not PRSNR P1 is not lower than the threshold Psh is made (S207). When PRSNR P1 is not lower than the threshold Psh (YES in S207), the determination whether or not the difference Pd is not more than the upper limit value Pd−sh is further made (S212) When the difference Pd is not more than the upper limit value Pd−sh (YES in S212), the test power Pwt at that time is set to the recording power Pw (S208).

On the other hand, when the reproduction RF signal level L1 is more than the reproduction RF signal level L0 (NO in S206), the test power Pwt is decreased by APL (S209), and the flow returns to S203 to perform the processes from S203. When the reproduction RF signal level L1 is not more than the reproduction RF signal level L0 while PRSNR P1 is lower than the threshold Psh (NO in S207), the test power Pwt is increased by ΔPm (S210), and the flow returns the S203 to perform the processes from S203. When the conditions of L1=<L0 and P1>=Psh are satisfied while the condition of Pd=<Pd−sh is not satisfied (NO in S212), the test power Pwt is decreased by ΔPn (S213), and the flow returns the S203 to perform the processes from S203. PRSNR P1, PRSNR P2, the reproduction RF signal level L1, and the difference Pd are determined through these processes when the test write is performed with the new test power Pwt. The conditions of S206, S207, and S212 are evaluated based on the determined PRSNR P1, PRSNR P2, reproduction RF signal level L1, and difference Pd.

According to the second embodiment, as with the first embodiment, the test write is performed to the two adjacent tracks, and the recording power Pw in recording the main information is set from the states of the reproduction signals obtained from the two tracks. Therefore, the recording power can be set in consideration of the degradation of the signal property in the already-recorded tracks due to the leakage of the laser beam. According to the second embodiment, the recording power Pw is set such that the PRSNR P1 is not lower than the threshold Psh, so that the reproduction signal property can be prevented from falling down to a level at which the signal processing system cannot cope with the reproduction signal property.

In the flowcharts of FIGS. 8 and 9, the recording power can be determined by the one-time test write when the conditions of S206, S207, and S212 are satisfied with the initially-set test power, so that useless consumption of the test zone can be prevented and a time necessary for the recording laser power setting operation can largely be shortened. In the flowcharts of FIGS. 8 and 9, from the viewpoint of shortening the time necessary for the recording laser power setting operation, the track T1 is reproduced after the track T2 is reproduced. However, the track T2 may be reproduced after the track T1 is reproduced.

According to the second embodiment, as shown below, the optical disk durability can be enhanced compared with the case in which the recording power is set such that PRSNR becomes the maximum. That is, the degradation of the recording film property can be suppressed compared with the case in which the recording power is set such that PRSNR becomes the maximum.

FIG. 10A shows the verification result when the recording power was set such that PRSNR becomes the maximum, and FIG. 10B shows the verification result when the recording power was set according to the second embodiment. In FIG. 10, the horizontal axis indicates the number of reproduction times and the vertical axis indicates PRSNR.

The verification was performed using the sample disk similar to that of FIG. 3. In the verification example of FIG. 10A, the recording power Pw was set to 9.5 mW with which PRSNR became the maximum based on the measurement result of FIG. 3A. In the verification example of FIG. 10B, the recording power Pw was set to 8.0 mW such that the conditions of S206, S207, and S212 of FIG. 9 were satisfied.

In the sample disk, the reproduction RF signal level L0 was 420 mV in S206, and the reproduction RF signal level L1 was 368 mV when the recording power Pw was set to 8.0 mW. Therefore, the condition of S206 was satisfied when the recording power Pw was set to 8.0 mW as shown in the verification example of FIG. 10B.

The threshold Psh was set to 15 in S207, and PRSNR (P1) of the track T1 was 24 when the recording power Pw was set to 8.0 mW. Therefore, the condition of S207 was satisfied when the recording power Pw was set to 8.0 mW as shown in the verification example of FIG. 10B.

The upper limit value Pd–sh was set to two in S212, and the difference Pd (Pd=P2–P1) was two (refer to FIG. 3) when the recording power Pw was set to 8.0 mW. Therefore, the condition of S212 was satisfied when the recording power Pw was set to 8.0 mW as shown in the verification example of FIG. 10B.

In the verification examples of FIGS. 10A and 10B, as with the first embodiment, the recording was sequentially performed from the disk inner circumference with the recording power set in the above-described manner, and the two adjacent tracks which were in the recorded state were selected and repeatedly reproduced. As with the first embodiment, the optical disk drive evaluation unit (type ODU-1000) produced by Plustec Industrial Co., Ltd. was used as the measuring machine. In the measurement, the disk linear velocity was set to 6.61 m/s (constant), and the reproduction laser power was set to 0.4 mW.

As can be seen from FIGS. 10A and 10B, the comparative example is higher than the first embodiment in PRSNR when the number of reproduction times is small. However, in the comparative example, PRSNR is rapidly decreased when the number of reproduction times exceeds about 700000 times, and PRSNR is lower than 15 and becomes not reproducible when the number of reproduction times exceeds about 800000 times. That is, the comparative example cannot satisfy the number of reproduction times of 1000000 times defined in the standard.

On the other hand, in the second embodiment, PRSNR is maintained at a level not lower than 25 even if the number of reproduction times exceeds about 800000 times, and PRSNR can be maintained at a level not lower than 25 when the number of reproduction times reaches 1000000 times. That is, the second embodiment can satisfy the number of reproduction times of 1000000 times defined in the standard. According to the second embodiment, PRSNR tends to increase until the number of reproduction times reaches about 600000 times, and PRSNR becomes higher than PRSNR of the comparative example when the number of reproduction times exceeds about 300000 times.

As can be seen from comparison of FIGS. 10B and 5B, in the second embodiment, the reproduction durability can further be lengthened compared with the first embodiment. According to the second embodiment, it is clear that the degradation of the recording film property caused by the recording laser beam can further be suppressed compared with the first embodiment.

Thus, according to the second embodiment, the number of reproducible times can remarkably be lengthened to the number of times demanded in the standard while PRSNR is maintained at a high level. Therefore, according to the second embodiment, the optical disk durability and the data reliability can remarkably be enhanced.

In the second embodiment and the verification example of FIG. 10, it is assumed that the reproduction RF signal of each area is obtained by reproducing the pit forming area (system lead-in area) and the groove forming area (data lead-in area, data area, and data lead-out area) with the same power laser beam. However, in the case where the pit forming area differs from the groove forming area in the reproduction power due to the specifications, a scale of the reproduction RF signal from the pit forming area (system lead-in area) and a scale of the reproduction RF signal from the groove forming area (test zone) may be matched with each other by multiplying a ratio between the reproduction powers.

For example, in the case where the reproduction power is 0.5 mW for the pit forming area (system lead-in area) while the reproduction power is 0.4 mW for the groove forming area (data lead-in area, data area, and data lead-out area), a level which is obtained 0.8 time the reproduction RF signal level taken from the system lead-in area is set to the reproduction RF signal level L0 in S201 of FIGS. 8 and 9. Obviously, instead of the method of modifying the reproduction RF signal level L0, the reproduction power of the system lead-in area in setting the recording power may be set to 0.4 mW which is equal to the reproduction power applied to the groove area.

Although the first and second embodiments according to the present invention are described above, the invention is not limited to the first and second embodiments.

In the first and second embodiments, PRSNR is used as the parameter value concerning right and wrong of the reproduction signal. Alternatively, are production error rate, CN, a jitter value may be used as the parameter value.

It is not always necessary that the test write be performed for one loop of the track with the same power. For example, the one loop of the track is divided into plural areas, and the test write may be performed while the power is switched in each area. In this case, each track is equally divided in a circumferential direction. In adjacent areas of the tracks, the test write is performed with the same power.

Figure 11:
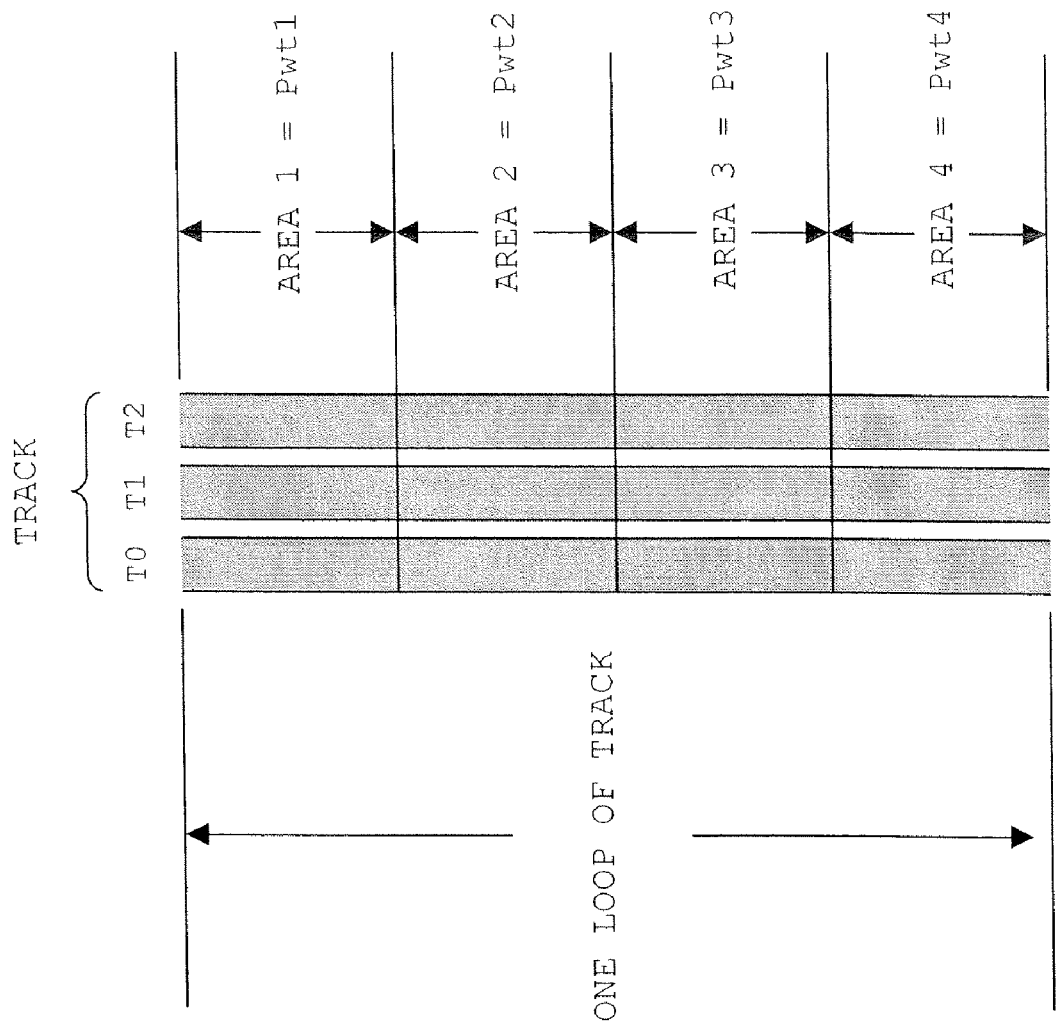
FIG. 11 shows an example of division of test write track according to an embodiment of the present invention.
Figure 12B:
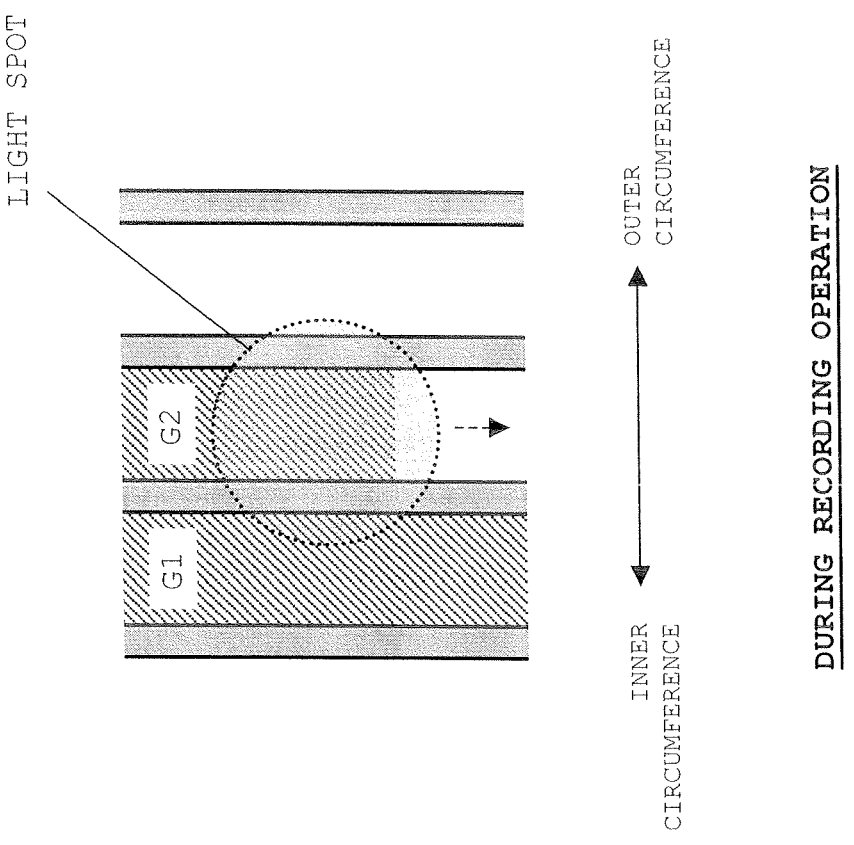
FIG. 12 is a view explaining a recording operation for a Low-to-High type HD DVD.
Figure 12A:
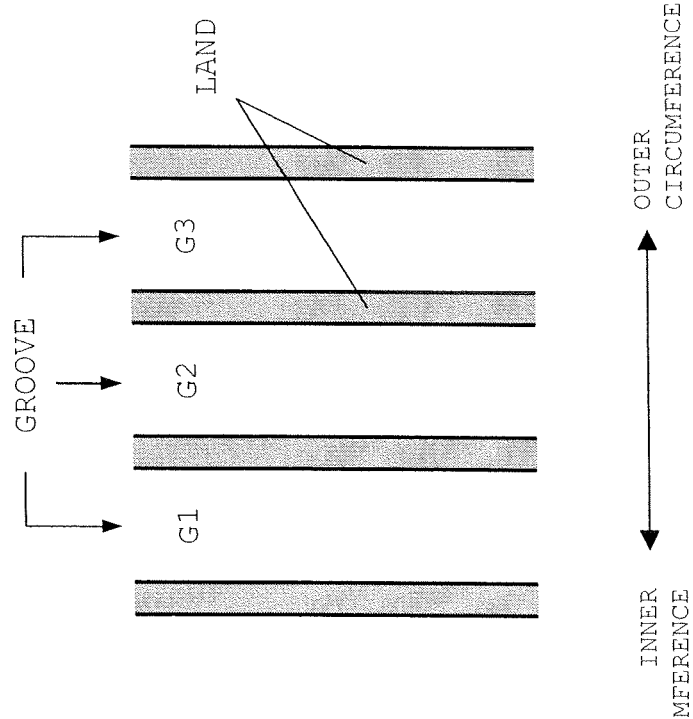

FIG. 11 shows an example in which one loop of the track is divided into four areas. In this case, the test write is performed to areas 1 of the tracks T1 and T2 with the same test power Pwt1, and the test write is performed to areas 2 subsequent to the areas 1 with a test power Pwt2 different from the test power Pwt1.

The so-called write strategy in which a peak of the recording power is changed in each mark length in a stepwise manner is neglected in the first and second embodiments. However, obviously the first and second embodiments can appropriately be applied the demand of power condition including the write strategy.

In the first and second embodiments, the test write is performed to the two adjacent tracks under the same power condition. Alternatively, the test write is performed to at least three adjacent tracks under the same power condition. However, in this case, the time necessary to set the recording power is lengthened compared with the first and second embodiments.

It should be understood that various change and modifications can appropriately be made without departing from the scope of the technical thought shown in the appended claims.

What is claimed is:

1. An optical disk apparatus comprising:
   an optical pickup which irradiates an optical disk with a laser beam; and
   a recording power setting circuit which sets a recording power of the laser beam,
   wherein the recording power setting circuit performs test write with a predetermined test power to a first track on the optical disk, performs test write with the same test power as the test write in the first track to a second track adjacent to the first track, reproduces the first track and the second track to obtain reproduction signals respectively, and determines whether or not the test power is set to a recording laser power in recording main information based on a relationship between the obtained reproduction signals, and
   wherein the recording power setting circuit reproduces the first track and the second track to obtain parameter values concerning a quality of the reproduction signal respectively, and determines whether or not the test power is set to a recording laser power in recording main information based on magnitude of a change between a first parameter value obtained from the first track and a second parameter value obtained from the second track, and
   wherein the recording power setting circuit determines whether or not the test power is set to a recording laser power in recording main information based on a condition that the magnitude of the change between the first parameter value and the second parameter value exists within a range of a predetermined first threshold and, at the same time, based on a condition that the first parameter value exists within a range of a predetermined second threshold, and
   wherein the recording power setting circuit obtains a plurality of samples of the first parameter value and the second parameter value by repeating the test write and the reproduction while changing the test power,
      selects the samples in which the magnitude of the change between the first parameter value and the second parameter value exists within a range of a predetermined first threshold and, at the same time, the first parameter value exists within a range of a predetermined second threshold, and
      sets a test power corresponding to one of the selected samples to a recording laser power in recording main information.

2. The optical disk apparatus according to claim 1, wherein the recording power setting circuit sets a test power corresponding to a sample having the largest first parameter value to a recording laser power in recording main information, in samples in which the magnitude of the change between the first parameter value and the second parameter value exists within a range of a predetermined first threshold and, at the same time, the first parameter value exists within a range of a predetermined second threshold.

3. An optical disk apparatus comprising:
   an optical pickup which irradiates an optical disk with a laser beam; and
   a recording power setting circuit which sets a recording power of the laser beam,
   wherein the recording power setting circuit performs test write with a predetermined test power to a first track on the optical disk, performs test write with the same test power as the test write in the first track to a second track adjacent to the first track, and determines in information based on a reproduction signal obtained in reproducing the first track whether or not the test power is set to a recording laser power in recording main information based on a reproduction signal obtained in reproducing the first track, and wherein the recording power setting circuit obtains a first amplitude level and a first parameter value concerning a quality of a reproduction signal from the reproduction signal obtained in reproducing the first track, obtains a second amplitude level from a reproduction signal obtained in reproducing an emboss area on the optical disk, and determines whether or not the test power is set to a recording laser power in recording main information based on a condition that the first amplitude level is not more than the second amplitude level and, at the same time, based on a condition that the first parameter value exists within a range of a predetermined first threshold.

4. The optical disk apparatus according to claim 3, wherein the recording power setting circuit reproduces the second track to obtain a second parameter value concerning the reproduction signal, and
   determines whether or not the test power is set to a recording laser power in recording main information based on a condition that the first amplitude level is not more than the second amplitude level and, at the same time, based on a condition that the first parameter value exists within the range of the predetermined first threshold and, at the same time, based on a condition that magnitude of a change between a second parameter value and the first parameter value exists within a range of a predetermined second threshold.

5. An optical disk apparatus comprising:
   an optical pickup which irradiates an optical disk with a laser beam; and
   a recording power setting circuit which sets a recording power of the laser beam,
   wherein the recording power setting circuit performs test write with a predetermined test power to a track on the optical disk, reproduces the track after the test write to obtain a first amplitude level of a reproduction signal reproduced from the track, obtains a second amplitude level from a reproduction signal obtained in reproducing an emboss area on the optical disk, and determines whether or not the test power is set to a recording laser power in recording main information based on a condition that the first amplitude level is not more than the second amplitude level.

6. The optical disk apparatus according to claim 5, wherein the recording power setting circuit obtains a parameter value concerning a quality of a reproduction signal from the reproduction signal obtained in reproducing a track after the test write, and
   determines whether or not the test power is set to a recording laser power in recording main information based on a condition that the first amplitude level is not more than the second amplitude level and, at the same time, based on a condition that the parameter value exists within a range of a predetermined threshold.

* * * * *